United States Patent [19]

Melugin

[11] Patent Number: 4,647,229
[45] Date of Patent: Mar. 3, 1987

[54] SHAFT RESTRAINING DEVICE

[75] Inventor: Simeon A. Melugin, Capistrano Beach, Calif.

[73] Assignee: Lamcor, Inc., Anaheim, Calif.

[21] Appl. No.: 779,427

[22] Filed: Sep. 24, 1985

[51] Int. Cl.[4] ............... F16C 35/00; F16C 35/02; G05G 5/00

[52] U.S. Cl. ................................ 384/434; 70/186; 384/435; 384/440

[58] Field of Search ............... 384/217, 218, 416–419, 384/428, 434–437, 440; 70/182–187

[56] References Cited

U.S. PATENT DOCUMENTS

| | | | |
|---|---|---|---|
| 1 | 7/1924 | Van Hook | 384/217 |
| 703,667 | 7/1902 | Owens . | |
| 718,268 | 1/1903 | Meats . | |
| 983,347 | 2/1911 | Buschor | 248/262 |
| 1,148,741 | 8/1915 | Beede . | |
| 1,184,614 | 5/1916 | Brightman | 384/440 X |
| 1,248,259 | 11/1916 | Brown . | |
| 1,255,443 | 2/1918 | Lea | 384/419 |
| 1,379,818 | 5/1921 | Hinnekens . | |
| 1,529,066 | 3/1925 | Hathaway | 384/217 |
| 1,628,709 | 5/1927 | Dawson . | |
| 2,216,709 | 10/1940 | Langille | 384/416 X |
| 2,514,152 | 7/1950 | Darash . | |
| 2,521,321 | 9/1950 | Ax et al. | 384/436 |
| 3,035,862 | 5/1962 | Phelps . | |
| 3,353,878 | 11/1967 | Valdettaro et al. | 384/435 |
| 3,563,615 | 2/1971 | Dobelin | 384/440 |
| 3,994,543 | 11/1976 | Melugin | 384/435 |
| 4,329,953 | 5/1982 | Row | 70/186 X |

Primary Examiner—Stuart S. Levy
Assistant Examiner—Thomas R. Hannon
Attorney, Agent, or Firm—Lyon & Lyon

[57] ABSTRACT

Two spaced support members support a shaft horizontal in partial lower bearing journal surfaces. A retractable pin is positioned above the shaft at each support member to retain the shaft in the journal surfaces. A shelf at each journal surface in front of the pins provides for loading and unloading of the shaft. A flat locking surface fixed to rotate with the shaft and a mating engagable locking member prevent rotation of the shaft.

15 Claims, 3 Drawing Figures

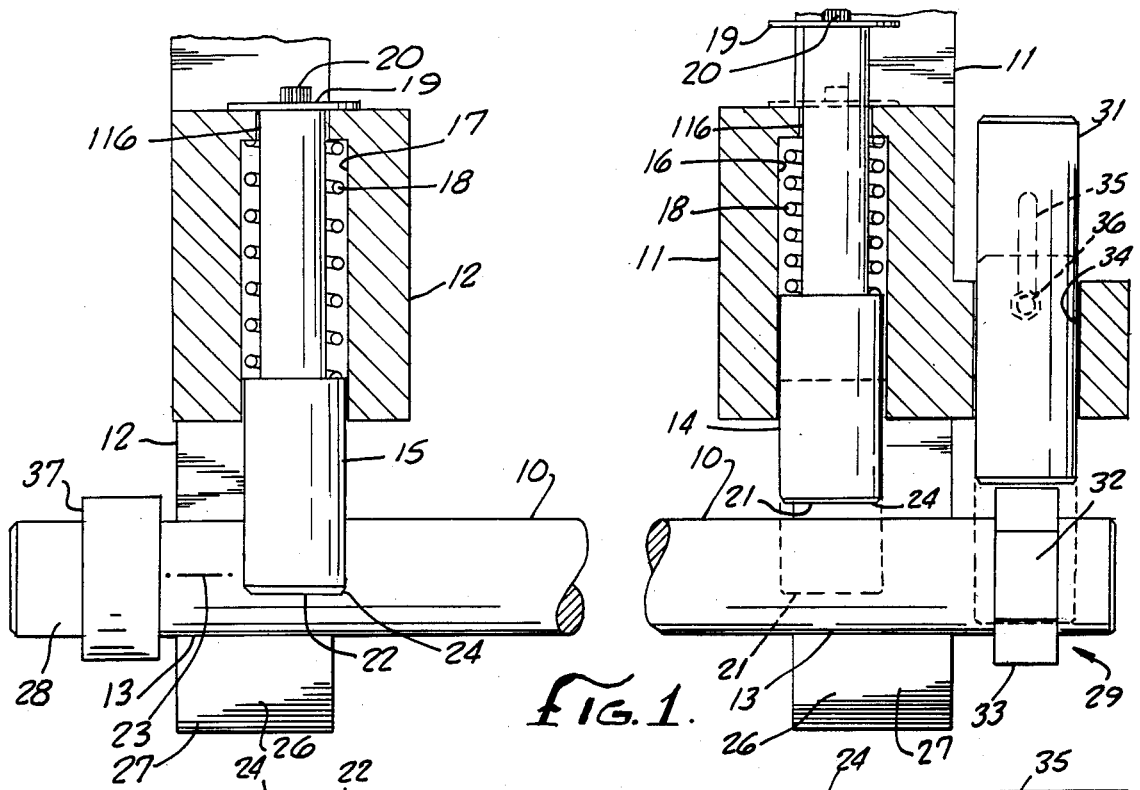
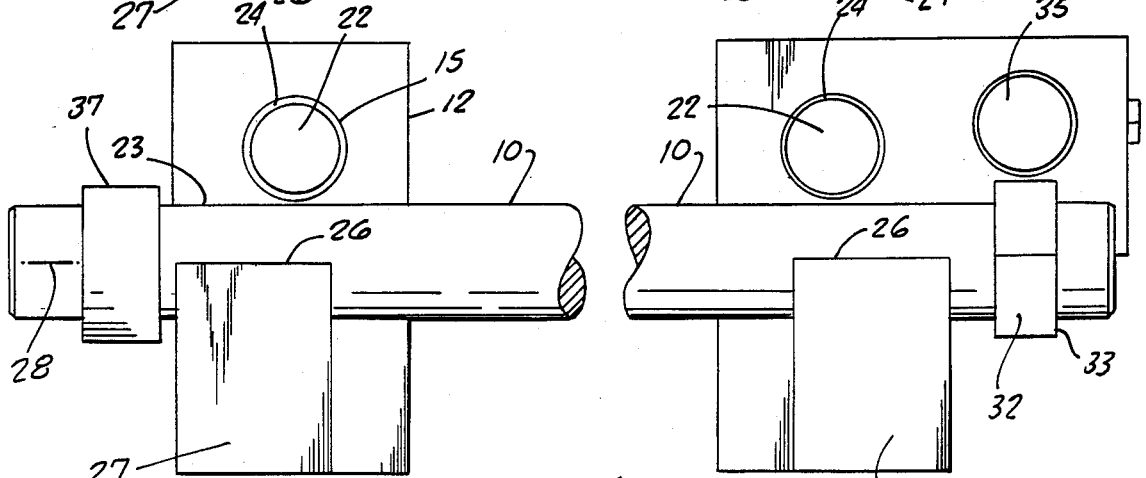
Fig. 1.
Fig. 2.
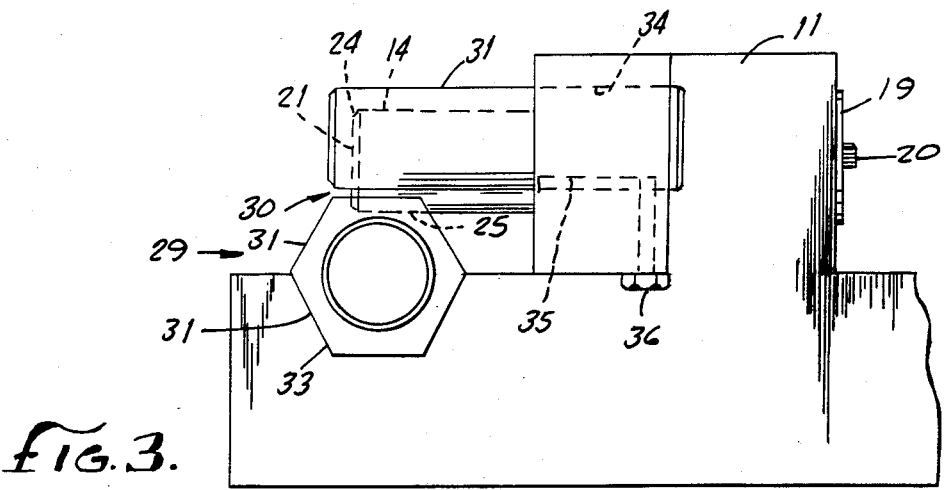
Fig. 3.

SHAFT RESTRAINING DEVICE

BACKGROUND OF THE INVENTION

The field of the invention is a shaft restraining device and particularly a shaft restraining device preventing removal of a shaft from rotationally supporting journal surfaces.

Devices which restrain shafts are known. One device described in U.S. Pat. No. 3,994,543 uses a slidable detent having a recess to retain a shaft in a cradle formed by a pair of rollers. Although this device is satisfactory it is costly to manufacture. Other devices for retaining a shaft are complex and difficult to use.

SUMMARY OF THE INVENTION

The present invention is a shaft restraining device in which a shaft is positioned horizontally for rotation within journal surfaces. A retractable pin extends over the shaft at each journal. A shelf on each support member which extends from the journal surface in front of the retractable pin provides simplified loading of the shaft into the journal surfaces. The shaft is rested on the shelf and pushed towards the journal surfaces until it contacts the retractable pins. The retractable pins retract against a biasing means until the shaft enters into the journals. Once the shaft is loaded the pins extend over the shaft to prevent removal of the shaft. The novel shaft restraining unit provides simple, reliable and easy loading of the shaft onto journals. The novel shaft restraining unit also is released easily for simplified unloading of the shaft. The shaft restraining unit also may include a rotational locking device to lock the shaft against rotation. The rotational locking device also is simple and easy to use.

BRIEF DESCRIPTION OF THE DRAWINGS

FIG. 1 illustrates a plan view of the novel shaft restraining and shaft rotational locking devices of the invention.

FIG. 2 illustrates a front elevational view of the novel devices of FIG. 1.

FIG. 3 illustrates an end elevational view of the novel devices of FIGS. 1 and 2.

DETAILED DESCRIPTION OF THE PREFERRED EMBODIMENT

In FIGS. 1, 2 and 3 a shaft 10 is positioned on a right or first support member 11 and on a left or second support member 12. The support members 11 and 12 each have a lower journal surface 13 for supporting the shaft 10 substantially horizontal. The journal surface 13, as best shown in FIG. 3, is about one-half the diameter of the shaft 10. The journal surface 13 may be formed directly in the support members 11 and 12 or it may have a removable bearing member having a bearing surface as is known. A spool of wire (not shown) may be positioned on the shaft 10. The weight of the shaft 10 and the spool of wire hold the shaft 10 rotatably supported in the journal surface 13 at each support member 11 and 12.

A first retractable pin 14 is positioned above the shaft 10 in the first support member 11 and a second retractable pin 15 is positioned above the shaft 10 in the second support member 12. The pins 14 and 15 are positioned in holes 16 and 17 respectively in the first and second support members 11 and 12. Each of the pins 14 and 15 have a reduced diameter 116. A biasing spring 18 is positioned on each pin 14 and 15 at the reduced diameter 116 within the holes 16 and 17 to force the pins 14 and 15 outward to an extended or loading position. Each of the pins 14 and 15 also have a retaining washer 19 and fastener 20 for retaining the pins 14 and 15 within the holes 16 and 17.

As shown in FIGS. 1 and 3 each of the pins 14 and 15 have ends 21 and 22 extending over the shaft 10. It is preferred that the ends 21 and 22 extend over the midpoint 22 of the top of the shaft 10 sufficient to restrain the shaft 10 if it moves upward from each of the journal surfaces 13. It is preferred that the ends 20 and 21 extend about ⅛ to ¼ inch over the midpoint 22 of the top of the shaft 10. Each of the ends 20 and 21 also have a chamfer 24.

The pins 14 and 15 as shown in FIG. 3 are positioned spaced above the shaft 10. It is preferred that the lower surface 25 of the pins 14 and 15 be about 1/16 inch above the shaft 10. With the shaft 10 positioned in the journal surfaces 13 there is no contact with the pins 14 and 15.

Also shown in FIGS. 1, 2 and 3 is a shelf 26 on each of the first and second support members 11 and 12. The shelf 26 extends from the journal surface 13 in front of the extended ends 21 and 22 of the first and second retractable pins 14 and 15 to the forward ends 27 of the support members 11 and 12. The shelf 26 is flat and forms a loading surface for the shaft 10. As previously described the journal surface 13 is about one-half the diameter of the shaft 10, therefore, the shelf 26 extends from about the midpoint 28 of the front of the shaft 10. With the shaft 10 loaded on the shelf 26 it is in contact with the chamfers 24 of the ends 21 and 22 of the first and second pins 14 and 15. Since the shelf is spaced below the lower surface of the first and second pins 14 and 15, lateral sliding of the shaft on the shelf against the extended first and second ends 14 and 15 retract these pins 14 and 15 sufficiently for entry of the shaft 10 into the journal surfaces 13. The first pin 14 is shown retracted in FIG. 1. As soon as the shaft 10 passes into the journal surface 13, the pins 14 and 15 return to their extended positions above the shaft 10 where they prevent the shaft 10 from moving out of or being lifted out of the journal surfaces 13.

A shaft rotational locking device 29 on the shaft 10 is mounted on the first support member 11 as shown in FIGS. 1, 2 and 3. The shaft rotational locking device 29 includes a locking surface 30 rotationally oriented with the shaft 10 and a locking member 31 for engagement with the locking surface 30 to prevent rotation of the shaft 10.

In the preferred embodiment the locking surface 30 is a flat surface 32 which is a chord to the shaft 10. As shown in the Figures, a collar 33 fixed to the shaft 10 includes at least one flat surface 32. To permit locking the shaft 10 at different angular positions the collar 33 is formed as a hexagonal member with six flat surfaces 32. The flat surface may also be formed across a chord of the shaft or an enlarged diameter of the shaft or formed of a plate fixed to the surface of the shaft.

The locking member 31 is mounted in a hole 34 in the first support member 11. The locking member 31 includes a slot 35 and a fastener 36 which engages the slot 35. The slot 35 with engaging fastener 36 limits the movement of the locking member 31 from a first retracted position as shown in FIG. 1 to a second extended shaft rotational locking position as shown in FIG. 3. In the retracted position it is necessary that the collar 33 rotate freely without contact with the locking member 31 to permit free rotation of the shaft 10. In the extended position the locking member 31 extends about the length of the flat surface 31. With the locking member 31 engaged adjacent the flat surface 32 the shaft 10 is locked against rotation.

A second collar 37 is fixed to the shaft 10. The collars 33 and 37 are positioned at each end of the shaft 10 adjacent the first and second support members as shown in FIG. 1 and restrict axial movement of the shaft 10. A small axial movement is permitted but it is limited since the bottom surface 38 of the locking member 31 must fully engage the flat surface 32 on the collar 33.

Although the shaft rotational locking device 29 is shown and described associated only with the first support member 11, a shaft rotational locking device may also be associated with the second support member 12.

The operation of the shaft restraining device provides loading and unloading of the shaft 10 by one person. As previously described the shaft 10 is rested on the shelves 25 and laterally moved into the journals 13 by pushing the extended pins 13 and 14 to a retracted position. The pins 13 and 14 then snap back to the extended position. The shaft 10 once in the operational position in the journals 10 is locked against rotation by moving the locking surface 32 to the extended locking position. The rotation of the shaft 10 is restored by moving the locking member 31 to the retracted position. The shaft 10 is also, simply unloaded by lifting it while at the same time pushing the pins 13 and 14 back until the shaft lifts free of the journals 13. As the shaft 10 is unloaded it may be rested on the shelves 25.

While embodiments of a shaft restraining device with shaft rotational locking device is described, it would be apparent to those skilled in the art that many modifications are possible without departing from the inventive concepts herein. The invention, therefore is not to be restricted except in the spirit of the appended claims.

What is claimed is:

1. A shaft restraining device comprising
    two spaced support members each having a substantially horizontal journal surface for rotatably supporting the shaft on a lower surface thereof,
    a retractable pin positioned extending over the shaft at each support member to restrain removal of the shaft from each of said journal surface, and
    a shelf on each of said support members extending from said journal surfaces in front of each of said retractable pins.

2. The device of claim 1 further comprising means biasing said retractable pin to an extended position over the shaft.

3. The device of claim 1 wherein said shelf is spaced below a lower surface of said retractable pin to permit lateral sliding of the shaft on said shelf against said retractable pin to retract said retractable pin sufficient for entry of said shaft into said journal surface.

4. The device of claim 1 further including
    a flat locking surface fixed for rotation with the shaft,
    a locking member engaging said flat locking surface to prevent rotation of the shaft.

5. The device of claim 4 wherein said shaft includes a collar portion for restraint of axial movement with said support member, said collar portion having said flat surface.

6. The device of claim 4 wherein said locking member is retained in said support member to move substantially tangentially relative to the shaft from a first disengaged position to a second engaged position with said locking surface.

7. The device of claim 4 wherein the shaft includes an enlarged portion, said flat surface formed on said enlarged portion.

8. The device as claimed in claim 7 wherein the flat surface is a locking surface rotationally associated with the shaft, said flat locking surface being substantially parallel to a tangent to the shaft, and said locking surface being rotatable with said shaft and said locking member extending adjacent said flat locking surface to engage said flat locking surface to prevent the shaft from rotating.

9. The device of claim 8 wherein said shaft includes a collar portion for restraint of axial movement with said support member, said collar portion having said flat surface.

10. The device of claim 9, wherein said locking member is retained in said support member to move substantially tangentially relative to the shaft from a first disengaged position to a second engaged position with said locking surface.

11. A shaft rotational locking device comprising
    a member for rotatably supporting the shaft,
    a flat locking surface rotationally associated with the shaft, said flat locking surface substantially parallel to a tangent to the shaft, and
    a locking member for engagement with said locking surface to prevent rotation of the shaft, said locking surface being rotatable with said shaft, and said locking member extending adjacent said flat locking surface to engage said flat locking surface to prevent the shaft from rotating.

12. A shaft restraining device comprising
    two spaced support members each having a substantially horizontal journal surface for rotatably supporting the shaft on a lower surface thereof,
    a retractable pin positioned to extend over the shaft at each support member to restrain removal of the shaft from each of said journal surface, and
    a shelf on each of said support members extending from said journal surfaces in front of each of said retractable pins, the pin having a surface for engaging the shaft, said surface being normally spaced apart from the shaft during shaft rotation.

13. A shaft restraining device comprising
    two spaced support members each having a substantially horizontal journal surface for rotatably supporting the shaft on a lower surface thereof,
    a retractable pin positioned to extend over the shaft at each support member to retrain removal of the shaft from each of said journal surface, the pin having a surface for restrainingly engaging the shaft, said surface being spaced apart from the shaft during normal shaft rotation,
    a shelf on each of said support members extending from said journal surfaces in front of each of said retractable pins, said shelf being spaced below a lower surface of said retractable pin to permit lateral sliding of the shaft on said shelf, said retractable pin being retractable sufficient for entry of said shaft into said journal surface,
    a flat locking surface fixed for rotation with the shaft, said surface being substantially parallel to a tangent to the shaft, and
    a locking member for engaging said flat locking surface to prevent rotation of the shaft.

14. The device of claim 13 wherein said shaft includes a collar portion for restraint of axial movement with said support member, said collar portion having said flat surface.

15. The device of claim 14, wherein said locking member is retained in said support member to move substantially tangentially relative to the shaft from a first disengaged position to a second engaged position with said locking surface.

* * * * *